Oct. 4, 1949.  J. J. MAGGI  2,483,423
PARACHUTE
Filed June 5, 1946  2 Sheets-Sheet 2
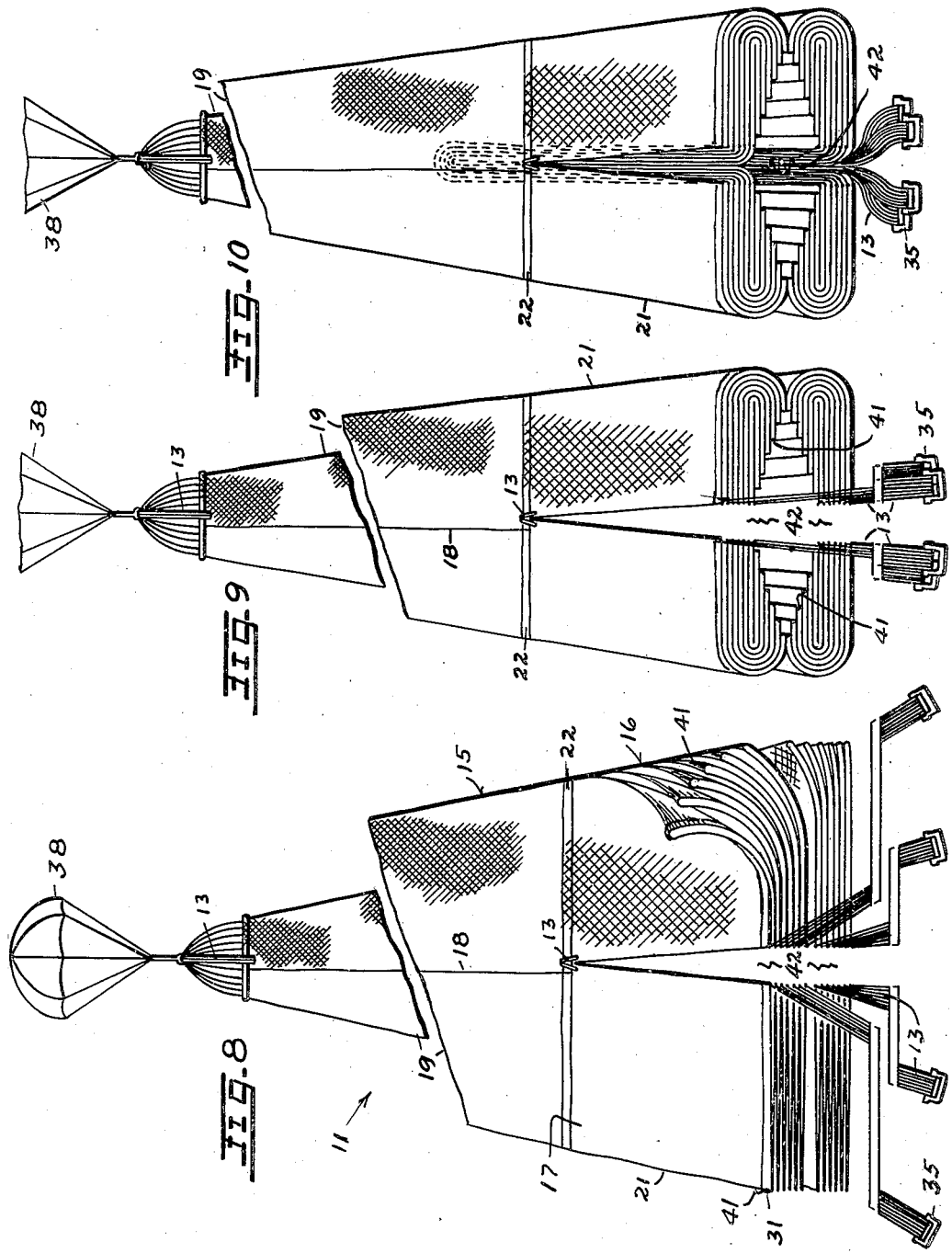
INVENTOR
JOHN J. MAGGI
BY Henry N. Young
ATTORNEY Patented Oct. 4, 1949

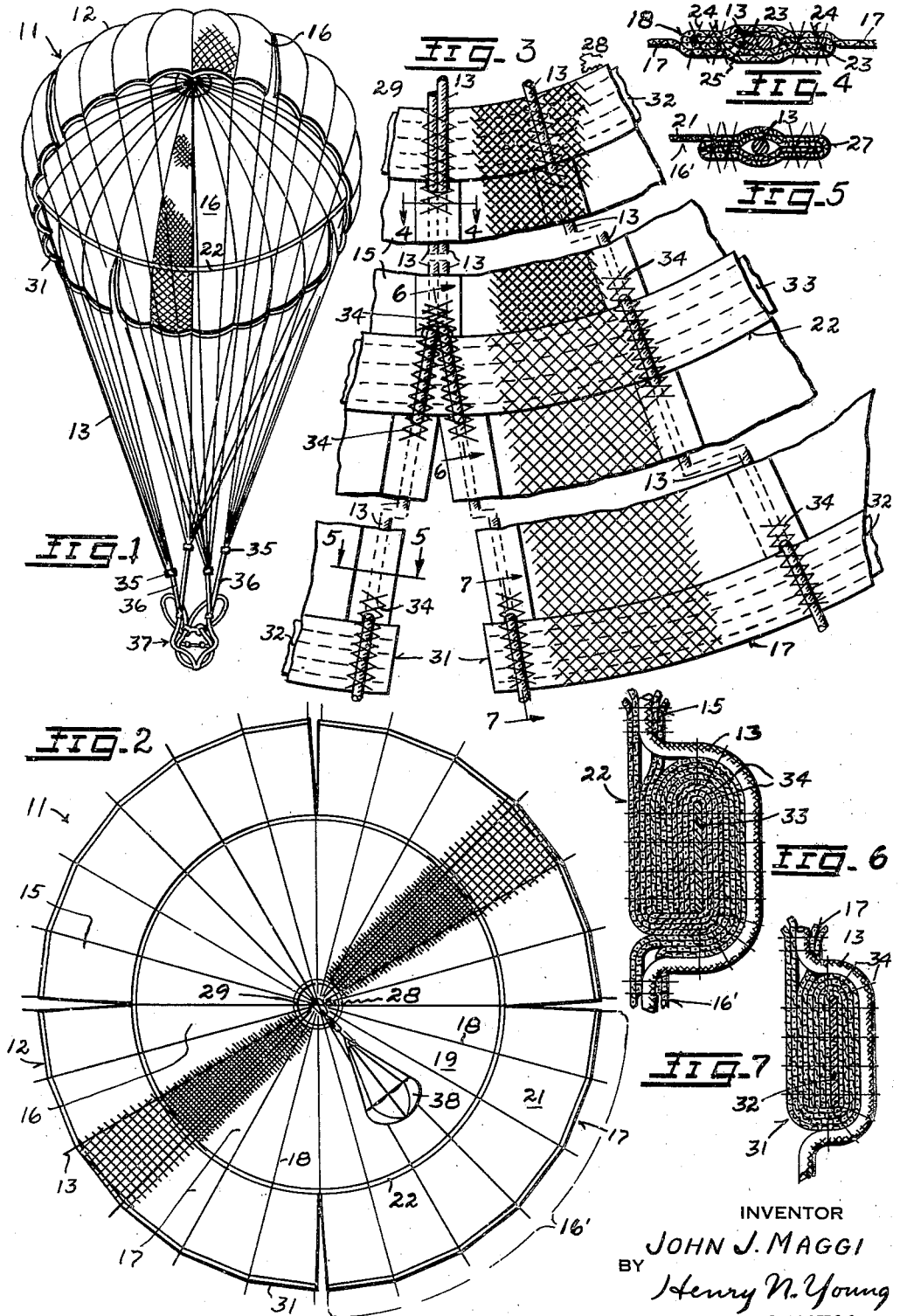

2,483,423

UNITED STATES PATENT OFFICE 2,483,423

PARACHUTE

John J. Maggi, Hayward, Calif.

Application June 5, 1946, Serial No. 674,554

5 Claims. (Cl. 244—145)

The invention relates to those structural features of a parachute which concern the opening and control thereof in the air after its release for opening.

The past and prospective future developments of aircraft to fly at increasing speeds and/or at higher altitudes has emphasized the importance of the various safety and control factors in the operation of parachutes to be used by escaping personnel or for the delivery of goods or equipment near the point of release. The present parachute structure has been developed in view of the new operating requirements brought about by the necessary high speed exit of a parachute with its load and for long flight due to increased altitude; said requirements concern the certainty of opening of the released parachute, the cushioning of the opening shock to prevent structural failure, the functioning and control of the airborne parachute, and other important factors of use. Accordingly, the parachute of my invention has been designed for meeting the present and future use requirements with aircraft whereby it may be as up-to-date as the aircraft with which it is to be used.

In view of the foregoing considerations, one specific object of the invention is to provide a parachute which is so constituted that its operative opening is truly assured after its pack is automatically cushioned by reason of a functioning of its structure, whereby to minimize the danger of damage to it and its load during its opening.

A further object is to provide an improved steering and alighting control of a parachute by a passenger thereof.

An added object is to provide a parachute structure which automatically prevents a swinging oscillation of its load beneath it.

Yet another object is to provide a parachute which tends to collapse when its load engages the ground, whereby to avoid the dragging of loads which is characteristic of parachutes heretofore known.

A still further object is to provide a parachute structure which may be packed in a particularly simple and effective manner.

The invention possesses other objects and features of advantage, some of which, with the foregoing, will be set forth or be apparent in the following description of a typical embodiment thereof, and in the accompanying drawings, in which, Figure 1 shows a parachute embodying the present features of invention in a load-supporting condition.

Figure 2 shows the parachute canopy spread open in a flat condition.

Figure 3 is an enlarged fragmentary view of portions of the canopy.

Figures 4 and 5 and 6 and 7 are enlarged fragmentary sections taken at the lines 4—4 and 5—5 and 6—6 and 7—7 respectively in Figure 3, the thickness of the fabric material at the sections being exaggerated.

Figures 8 and 9 and 10 illustrate successive steps taken in preparing the present parachute for zig-zag folding for packing it in a pack.

The improvements of interest are particularly shown as applied to a parachute structure 11 comprising a circular canopy 12 having lines 13 radiating from its center and arranged to support a harness or basket or cage in which persons and/or inanimate cargo may be carried. The canopy 12 has an inner, or apical, portion 15 which assumes a usual umbrella or cap form when expanded, and the canopy portion 16 beyond the continuous outer line of the portion 15 is radially divided along its length to provide laterally free skirt sections 16'. In the present structure, the canopy 12 is built up of a plurality of like triangular panels or gores 17 connected at their meeting edges by seams 18, and the panels 17 comprise inner and outer sections 19 and 21 fixed together at a continuous circular seam 22 whereby the sections 19 cooperatively provide the central canopy portion 12 and the sections 21 cooperatively provide the skirt portion 15. Preferably, and as indicated, the fabrics used to provide the apical and skirt portions 15 and 16, respectively, have different degrees of air permeability, the air permeability of the fabric used in the portion 15 being of a usual relatively low degree while the air permeability of the material in the portion 16 is relatively high, the permeability being understood as generally depending on the weaving gauge or mesh size as applied to such materials as silk or the like which are commonly used in parachute canopies.

The radial seams 18 are preferably so formed that the edges of the panel pieces are turned in, it being understood that the necessary bias cutting of the parachute fabric to provide the panel pieces produces ravelable edges which would be exposed if ordinary lap seams were provided. As is particularly brought out in Figure 4, side edge portions 23 of the gores 17 are turned back to provide edge folds of like width which are interengaged in a mutually hooked relation, and the seam is completed by applying parallel rows of stitching 24 longitudinally of the folds and adjacent their bends with the resulting seam 18 providing a channel or tubular space 25 between the lines of stitching 24 along its opposite sides. A present seam 18 comprises four thicknesses of the canopy material and is arranged to receive one or more suspension lines 13 through its space 25; for a reason hereinafter brought out, two lines are disposed through the space 25 at the section of Figure 4.

The division lines between the skirt sections 16' are in alignment with seams 18 and extend from the cross-seam 22 as defining slits 26 in the skirt portion 16 to define the side edges of its sections 16', said edges being formed with hems 27 of tubular form providing interior spaces for receiving a shroud line 13 therethrough. A preferred method of providing a hem 27 is to fold the material at the side edge of the skirt section blank to provide four thicknesses of material thereat as in Figure 5, and longitudinally stitch through the flattened structure adjacent its sides to complete the hem having a line-receiving space intermediately therethrough, said space then having two thicknesses of the skirt material at each side thereof, as is desirable.

In the assembly of the present canopy structure, the portion 15 is completely assembled with the seams 18 all completed, and the four skirt sections 16' are each completely assembled with their panels 21 connected by outer portions of the seams 18 where they are joined, and with the hems 27 provided at the sides of their assemblies. The canopy 12 is provided with a usual vent hole 28 at its center, or apex point, and the canopy material thereat is formed into a hem 29 providing the hole 28. The outer edges of the skirt section 16' are provided with hems 31.

The hems 29 and 31 are formed after the seams 18 and hems 27 have been provided in the different canopy portions, and are alike. Figure 7 shows a section of the hem 31, and discloses that the hem is provided by wrapping the outer edge of the skirt section 16' outwardly about a tape 32 to provide four thicknesses of the material opposite the outer tape face and eight thicknesses opposite the inner tape face. The formed hem is flattened and stitched through for its completion. It is to be noted that the thickness of the canopy material is exaggerated in the sectional showings thereof for purposes of clarity in showing the seam and hem assemblies.

Having the upper canopy portion 15 and the skirt portions 16 prefabricated in the manners indicated, the skirt sections 16' are attached to and around the outer edge of the canopy portion 15 at the seam 22 which is continuous about the canopy, said seam being provided by wrapping the outer edge part of the assembled portion 15 and the inner edge parts of the assembled skirt sections 16' outwardly about a continuous flexible tape 33 and stitching through the flattened structure to complete the seam. As is brought out in Figure 6 the resulting seam structure in the line of a seam 18 provides eight layers of fabric opposite the outer face of the tape and twelve layers of the fabric opposite the inner tape face.

It will now be noted that the seams 18 of the present canopy assembly radiate symmetrically from the canopy center or apex, and that the shroud lines radiate similarly from said center. At those seams 18 which extend through both the inner and skirt portions of the canopy, each line 13 extends outwardly over the hem 29, through the seam space 25, outwardly over the seam 22, through the seam space 25 at the skirt, and outwardly over the skirt hem 31; the canopy portions 15 and 16 are suitably perforated adjacent the hems and seam to provide for this threaded extension of the line along the canopy structure. At the four seams 18 which extend only to the slits between the skirt sections 16', two suspension lines 13 are provided, said lines engaging the inner hem 29 and shroud portion 15 as before, and passing over the seam 22 into and through the spaces of the side skirt hems 27, and thence over the skirt hems 31. Where the lines 13 pass outwardly over the hems 29 and 31 and the seam 22, they are secured to the structure by suitable cross-stitching 34.

The sets of shroud lines 13 which are attached to the different skirt sections 16' are brought together at common connections 35 from which webs 36 extend to a harness for an article to be supported. The present parachute has been specifically shown as arranged for the support of a person who would wear a support harness 37 of a suitable type having the webs 36 connected thereto; generally speaking, the harness 37 represents any suitable container for an animate and/or inanimate load for the airborne parachute.

The present parachute is shown as being provided with a relatively small pilot parachute 38 for automatic mechanical opening following the release of the parachute and its load from a carrying aircraft and the opening of the parachute pack by the pulling of a usual rip cord; the pilot parachute 38 may be of the spring rib umbrella type which is held closed by and within the pack of the parachute 11 and is released for its functioning as said pack opens, it being understood that the structure of the parachute 11 is adapted to a usual zig-zag packing folding longitudinally thereof after the harness and free shroud line portions have been stowed.

Recalling that present parachute packs comprise a cover member providing flaps extending from a central portion on and against which the shroud lines must be arranged in a particular manner, the present parachute, by reason of its separate skirt sections, permits a simple folded stowing of the free suspension line portions within the parachute canopy instead, and thereby avoids the present intricate arrangement of shroud lines in the packed cover. When the shroud lines are disposed therein, the larger end of the folded canopy may be placed within the pack cover, and the canopy then folded in a zig-zag manner for its retained enclosure in a compressed condition within the closed cover while the harness is exposed for mounting the pack on the body of a person to position the pack against the buttocks or back of the wearer.

Figures 8 to 10 inclusive illustrate in order the three steps involved in preparing a present parachute 11 for its zig-zag packing in a usual manner. By reference to Figure 8, it will be noted that each panel has been folded upon its center line at a bend or fold 41 to bring all line-connection points into lines at the terminal corners of the slits 26 at opposite sides of the canopy structure, half of the folded panels being stacked on each side of said slits. The next step in preparing a present parachute for packing consists in symmetrically folding inwardly the fold edges of the panels into the space provided between those panels whose common connecting hem is aligned with the other two slits of the canopy skirt. Owing to the thickness of the parachute fabric, the inturned bends 41 and immediately adjacent fabric portions cooperate to define a space 42 within the folded parachute, said space having a generally diamond-shaped cross-section and tapering to a point adjacent the parachute center or apex; note Figure 9.

The space 42 of the parachute which has been folded into the condition illustrated in Figure 9, is arranged to receive the individual suspension lines 13 longitudinally extending in doubled condition therein, as is indicated in Figure 10, after which the canopy and line combination may be folded in a usual zig-zag manner for its enclosure with the pilot parachute 38 in the pack. It will be understood that the disposal of the suspension lines within the folded canopy structure is made possible by the presence of the skirt slits, and that such a disposal of the lines avoids a necessity for arranging them in the special manner against the pack bottom as is required with the parachutes now in common use. The widths of the panels is such that the maximum width of the folded parachute is no greater than that which is required for the packing folding and enclosure of the parachute, as within a cover or pack (not shown).

Having the present parachute packed, and its pack attached to a parachutist who has dropped from an aircraft, the pulling of the rip cord of the pack by the person or the aircraft or a timer releases the parachute to trail behind the parachutist and receive air for inflating and expanding it to provide the desired support. Because of the divided skirt structure and the relatively high permeability of the canopy fabric thereat, the entry of air within the lower end portion of the released canopy is permitted despite the fact that suspension lines are in a fully stretched condition which tends to keep the mouth of the canopy closed; with the present structure, the air is initially admitted through the slits 26. Accordingly, the canopy is arranged to progressively retain the opening air from the top down, subject only to a final venting action at the slits 26. As the air accumulates in the canopy, the latter is finally spread to its full extent, and is kept filled by reason of its settling movement in the air under the weight of its load whereby the weight of the load is assumed in a gradual and cushioned manner. Such an opening action is understood to be without damaging or injurious shocks to the parachute structure or its load because the canopy may not be whipped or snapped to wide-open condition.

When the inflation of the descending canopy is completed, the air pressure therein, being continuously greater than that in the surrounding air, causes a retarded escape of the air through the slits and skirt, and this action is automatically operative to prevent the swinging oscillatory action which is inherent in circular parachutes having a circumferentially unyielding bottom edge portion; such an oscillating swinging is caused and augmented by an alternate spilling of air from beneath opposite canopy rim points, no corresponding action being generally possible with present parachutes.

It will now be noted that the velocity of descent of the present parachute is readily controllable by a person comprising all or part of its load and may be readily effected by manipulating one or more web 36 which each control one-fourth of the suspension lines extending from the skirt portion 16'. Thus, simultaneously pulling down on opposite webs 36 will open the four slits to effect spilling of air to decrease the effective canopy capacity and so increase the rate of descent. If the supporting air is carrying the parachute laterally an opposite manipulation of an appropriate skirt portion 16' may, through permitting the selective slit spilling of air in a line which is angularly related to the direction of air flow, cause a veering of the parachute from the air flow direction, and thereby permit a definite steering action upon the parachute. It will thus be understood that the grouping of the suspension lines 13 in association with the different skirt portions 16' and the selective utilizing of the webs 36 as a manual control means for the behaviour of the parachute in the air provide an unusually effective control for the parachute.

When a load supported by the present parachute contacts the ground, the effect is to flatten out the canopy and so increase the spilling of air therefrom, whereby to speed the collapse of the parachute upon the ground, it being understood that the action is assured by the opening of the slits 26 between the relatively air-pervious skirt sections 16'.

From the foregoing description taken in connection with the accompanying drawings, the advantages of the construction and use of the present parachute will be readily understood by those skilled in the art to which this invention appertains. While I have described the features and principles of use of a parachute which I now consider to comprise a preferred embodiment of my invention, I desire to have it understood that the disclosure is primarily illustrative, and that such changes and developments may be made, when desired, as fall within the scope of the following claims.

I claim:

1. A parachute having a central circular canopy portion, a skirt portion of uniform radial width attached to and fully rimming said first portion and provided with an even number of evenly spaced slits extending thereinto from its peripheral edge and circumferentially dividing the skirt into sections, and support lines radiating from the center of the canopy and attached therealong to both canopy portions and cooperative in mutually independent sets extending from the different skirt sections to mutually spaced and relatively movable load connectors for the support of a load by and beneath the operatively extended parachute.

2. A structure in accordance with claim 1 having pairs of said support side lines extending in the lines of each slit and attached to the skirt portion at the different slit edges and extending to different said load connectors.

3. A parachute having a central circular canopy portion of flexible sheet material having a relatively low degree of air permeability, a skirt portion of uniform radial width of a flexible sheet material having a relatively high degree of air permeability attached to and fully rimming said first portion and divided into sections by radial slits equally spaced about the skirt portion and extending from its peripheral edge, and support lines radiating from the center point of the canopy attached therealong to both canopy portions, said support lines being provided in pairs in the slit lines and being fixed to the skirt portions at the different slit edges, and the support lines engaging each skirt section extending therefrom to a common load connector for solely those lines.

4. In a parachute, a circular canopy provided with four evenly spaced slits extending thereinto for like distances from its peripheral edge, and support lines radiating from the center point of the canopy and attached therealong, said support lines being provided in pairs in the slit lines and fixed to the canopy portions along the different slit edges, and the sets of lines extending from each said canopy portion being mutually connected at different load-support elements which are equally spaced from the center point of the canopy and are relatively free.

5. In a parachute, a circular canopy having an apical opening and built up of sector-shaped sections united by tubular lap seams along their engaged edges, said canopy comprising inner and outer sections of materials respectively having relatively low and relatively high degrees of air permeability and being united by a continuous seam, said canopy having encircling hems around its apical opening and its periphery, said outer canopy section having four evenly spaced radial slits extending thereinto for like distances through and from its peripheral hem to define separate portions thereof, four load-connection members, and support lines radiating from the center point of the canopy at said seams and extending at the outer faces of said hems and circular seam, and the lines extending from each said outer canopy portion being connected solely to a different said connection member.

JOHN J. MAGGI.

REFERENCES CITED

The following references are of record in the file of this patent:

UNITED STATES PATENTS

| Number | Name | Date |
|---|---|---|
| 1,366,843 | Smith | Jan. 25, 1921 |
| 1,767,534 | Lane | June 24, 1930 |
| 1,849,965 | Switlik | Mar. 15, 1932 |
| 2,089,140 | Tricau | Aug. 3, 1937 |
| 2,358,582 | Little | Sept. 19, 1944 |

FOREIGN PATENTS

| Number | Country | Date |
|---|---|---|
| 574,109 | France | Mar. 24, 1924 |